UNITED STATES PATENT OFFICE.

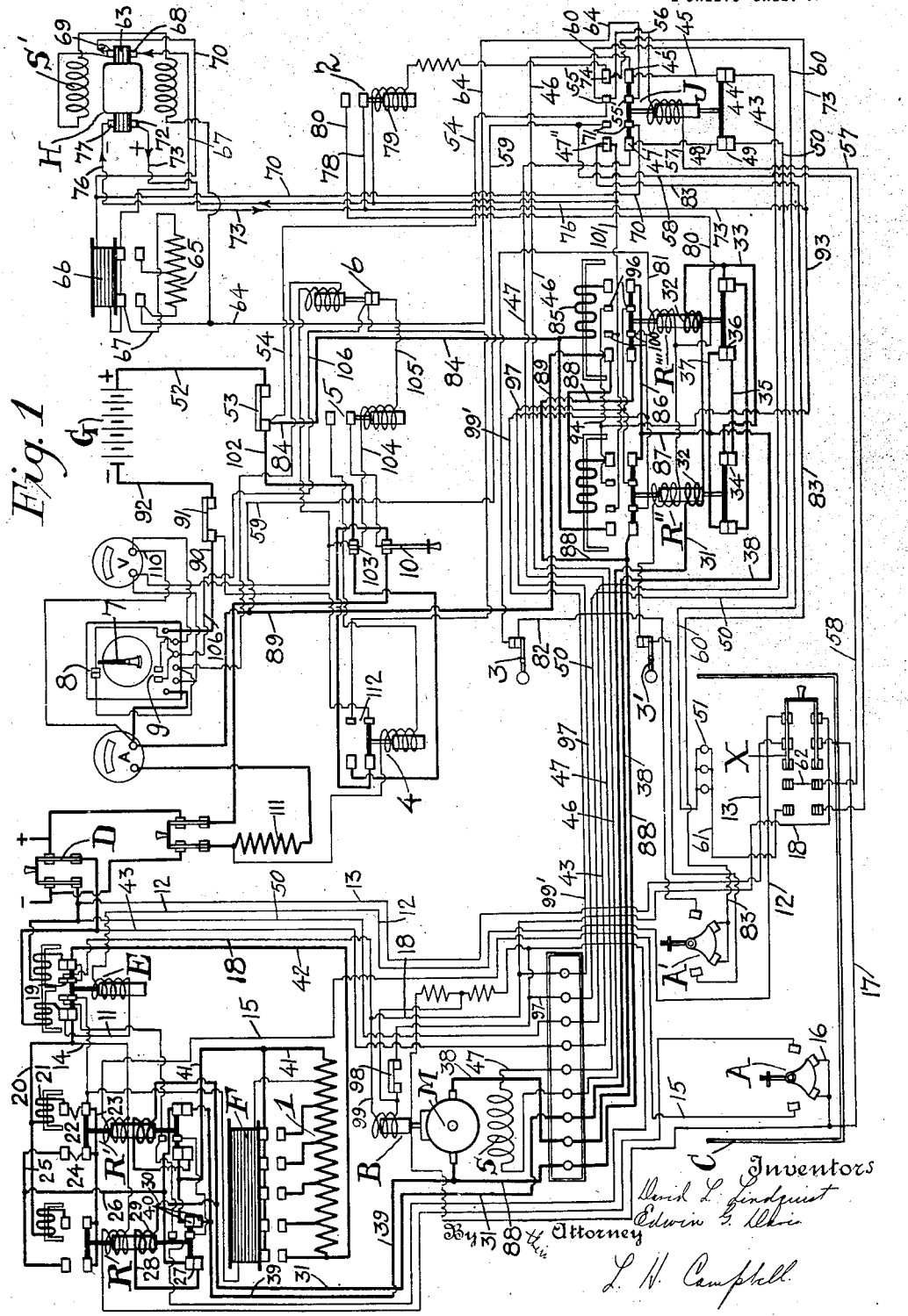

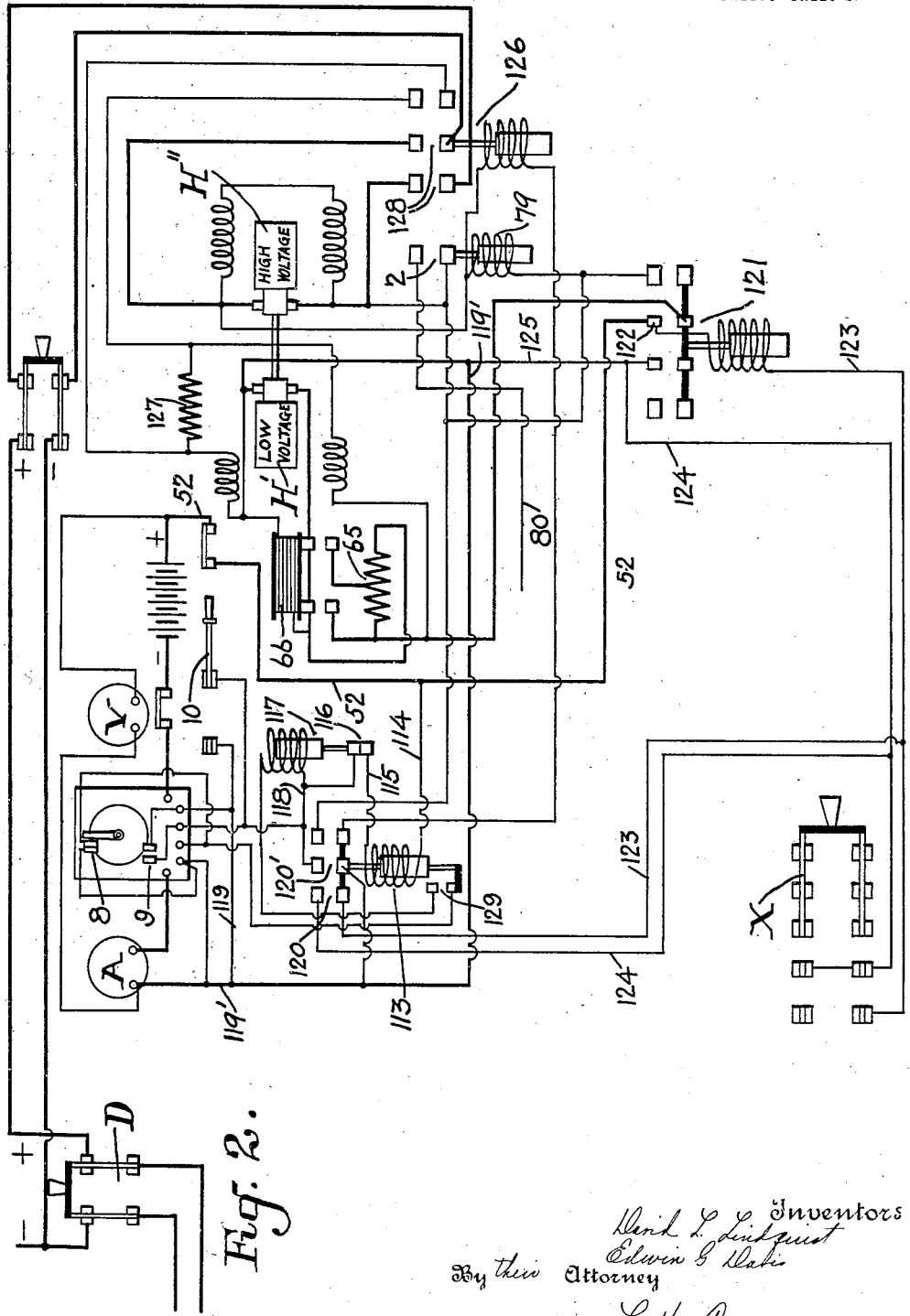

EDWIN G. DAVIS, OF NEW YORK, AND DAVID L. LINDQUIST, OF HARTSDALE, NEW YORK, ASSIGNORS TO OTIS ELEVATOR COMPANY, A CORPORATION OF NEW JERSEY.

DUAL SYSTEM OF ELECTRICAL CONTROL EMBODYING THE USE OF MAIN AUXILIARY SOURCE OF CURRENT-SUPPLY.

1,399,605.  Specification of Letters Patent.  Patented Dec. 6, 1921.

Application filed January 5, 1918. Serial No. 210,512.

*To all whom it may concern:*

Be it known that we, EDWIN G. DAVIS, a citizen of the United States, and resident of New York, in the county of New York and State of New York, and DAVID L. LINDQUIST, a subject of the King of Sweden, and resident of Hartsdale, in the county of Westchester and State of New York, have invented a new and useful Improvement in Dual Systems of Electrical Control Embodying the Use of Main Auxiliary Source of Current-Supply, of which the following is a specification.

Our invention relates to improvements in controlling apparatus for electric elevators; the invention more essentially consists in the provision of a dual system of control, one system in connection with a main line power source for the regular operation of the elevator under normal conditions, and an emergency system in connection with an auxiliary power source, the latter consisting of a storage battery and a motor generator or dynamotor or a direct current voltage transforming device, the storage battery being suitably controlled so as to be maintained in a charged condition and available at all times as an emergency power source in the event of a failure of the main line.

The invention further consists in the provision of means by which the operator of the elevator may immediately bring into use the auxiliary power source in the event of a failure of the regular power source, or for other reasons.

Other features of the invention will appear hereinafter.

In the accompanying drawings, Figure 1 illustrates diagrammatically, our invention as embodied in an elevator control system, and Fig. 2 illustrates a modified arrangement in which the motor generator is employed to charge the storage battery.

The elements will first be designated; referring to Fig. 1, they comprise an electric motor M having a shunt field winding S, the motor being adapted to operate an elevator car C through any of the well-known systems of hoisting apparatus; a usual type of electromagnetic brake B is provided; manual means to control the operation of the motor comprise the car switches A and A', A for the regular car operation, and A' for the emergency operation, a double throw safety switch X is located in the car, it serving when in one position as a car safety switch, and when thrown over, to complete circuits for bringing into use the emergency system and the car switch A', for controlling the hoisting motor M from the emergency system; emergency lights 51 are located in the car; other elements comprising the regular system to control the operation of the motor M from the main source of power supply consist of a main line switch D, a potential switch E, electro-magnetic reversing switches R, R', and an accelerating switch F, the latter operating in a well-known manner to control the motor starting resistance 1.

The emergency or auxiliary source of power supply comprises a storage battery G adapted to supply current for the armature of the hoisting motor M, and a motor generator or dynamotor or a direct current voltage transforming device H having field windings S', and a set of armature windings supplied from the storage battery, the dynamotor transforming, say, for example from 50 to 500 volts which it supplies for the shunt field winding S of the hoisting motor M and the brake winding. The reason for stepping up the voltage is merely because the windings may happen to be designed for high voltage supplied from the mains, and accordingly, it may be preferred to step up the low voltage supplied by the storage battery to the high voltage in question, rather than to provide two separate windings, one for the high voltage from the mains and the other for the low voltage supplied by the battery.

The emergency system to control the operation of the hoisting motor M from the auxiliary or emergency source of power consists of electro-magnetic reversing switches R'', R''', and electro-magnetic switch J, to control the circuit of the shunt field winding S and certain other circuits, hereinafter pointed out, an electro-magnetic switch 2, and automatic limit stop 3, 3'.

Apparatus automatically to effect the charging operation of the storage battery from the main line source of power supply comprises electro-magnetic switches 4, 5, 6, ammeter and voltmeter, and an ampere hour meter, the latter having a dial 7, associated therewith operable when the battery becomes fully charged to actuate and close contacts 8, and when the capacity of the battery drops to a predetermined value, to actuate and close the contacts 9. Charging operation of the battery by manual control can be effected by operation of a single pole switch 10.

Supply mains from any suitable source are designated + and —, the mains delivering a relatively high voltage, such for example, say 220 or 500 volts.

The control apparatus operates as follows to effect the regular operation of the car from the main source of power supply. For this operation the safety switch X assumes a position as shown in the drawing. The potential switch E is closed by throwing the switch X in its right hand position the switch being held closed by its winding so long as the safety switch X remains in the position shown. The circuit for the potential switch winding may be traced as follows; from + main to wire 11, through said winding to wire 12, switch X, wire 13, to — line. Moving the handle of car switch A toward the right hand, closes a circuit for the winding of the reversing switch R', as follows; + main to wire 14, winding of reversing switch R', wire 15, car switch contacts to wires 16, 17, switch X, wire 18 auxiliary contacts 19, thence through potential switch contacts to — line. The reversing switch R' will now operate to connect the motor M, and brake winding, to the main source of power supply. The brake will now release and the motor will start and be gradually accelerated to normal running speed. The motor circuit may be traced as follows;—from + main through potential switch to wire 20, through blowout coil 21, contacts 22, wire 23, contacts 24, wires 25, 26, contacts 27, wire 28, hold-down coil 29, wires 30, 31, through hold-down coils 32 associated with the emergency reversing switches R'', R''', wire 33, contacts 34, wire 35, contacts 36, wires 37, 38, thence through the armature of the hoisting motor M to wire 39, contacts 40, wire 41, starting resistance 1, wire 42, thence through potential switch to the — line. The shunt field winding S is connected across the mains and may be traced as follows; from + main, wire 43, contacts 44, wire 45 to contact 45', wire 46, through the shunt field winding S to wire 47, contact 47', wire 48, back contacts 49, and thence by wire 50 to the — line. Regarding the brake winding, it is sufficient to point out that it receives its supply at this time from the main source of power, the arrangement of circuits for the winding being well-known.

By centering the car switch handle, the hoisting motor and brake winding are disconnected from the main line source of power supply, and the brake is applied to bring the moving parts to rest.

Operation of the motor in a reverse direction is effected by moving the handle of the car switch A in a reverse direction to that just described, the parts functioning for this operation in a manner the same as just described.

The emergency control operates as follows to effect operation of the car from the auxiliary source of power supply.

In the event of a failure of the main line source of power supply, the emergency system is brought into use to effect operation of the car in the manner which will now be described; the first operation is to throw over the knife switch X from the position as shown to a left hand position, thus interrupting at this point, the circuits for the windings of the potential switch E, and of the main controller reversing switches R, R'.

With the switch thrown over to its left hand position as now assumed, circuits are closed for the winding of the field switch J and the emergency lights 51, they receiving the current supply from the storage battery G. The circuit for the winding of the switch J is as follows; from + side of battery to wire 52, fuse 53, wire 54, auxiliary contact 55 to wire 56, through winding of switch J to wire 57, switch X to wire 58, and thence by wire 59 to — side of the battery; the circuit for the lights 51 may be traced as follows; this circuit branches from the circuit for winding just traced, at the point 55, wire 60, lights 51 to wire 61, switch X to wire 62, where it forms a junction with the wire 58 leading to the minus side of the battery.

The switch J now operates and effects the operation of the dynamotor by connecting it with the storage battery G, the latter supplying current to the field windings S', and through the commutator 63 to one of the two sets of windings on the dynamotor armature, the supply circuit being traced as follows;—from + side of battery to wire 52, fuse 53, wire 54, contacts 55, 55', wire 64, through a sectional resistance 65 which is automatically regulated by an accelerating switch 66, wire 67, through one set of windings on the armature, the current entering by way of brush 68, and leaving at brush 69, wire 70, and by way of contacts 71 to wire 59 leading to the — side of the storage battery G.

The dynamotor is non-reversible and will now rotate continuously until the switch J is opened which is effected by means of the safety switch X.

The storage battery we will say for example supplies 50 volts, and the dynamotor transforms from 50 to 500 volts, which forms the supply for the shunt field winding S of hoisting motor M, and also the brake winding, the armature of the hoisting motor M being supplied from the storage battery. Thus during the emergency operation from the battery and dynamotor, the armature of the hoisting motor operates on substantially one-tenth normal voltage, which results in a comparatively slow car speed, such for example, 50 feet per minute, whereas on the other hand, the operation of the hoisting motor from the high voltage mains may give a car speed of, say, substantially 500 feet per minute.

The circuit for the shunt field winding of the hoisting motor may be traced as follows;—from + brush 72 of the dynamotor to wire 73, contacts 74, and 45', wire 46, field winding S, wire 47, contacts 47', 47", and thence by wire 76 to the — brush 77. From the description thus far given it will be seen that the shunt field winding S of the hoisting motor will remain energized so long as the field switch J remains closed, the latter switch being under the control of the safety switch X in the elevator car.

Now to effect operation of the hoisting motor M, the emergency car switch A' may be moved in the desired position, toward the left hand we will say for example, thereby closing a circuit for the winding of the emergency reversing switch R'''. The latter will now close, thereby connecting the armature of the hoisting motor M with the storage battery, and the brake winding in a circuit with the dynamotor supply mains 73 and 76, and in this manner the brake is caused to release and the hoisting motor put in motion.

The circuit for the armature of the hoisting motor M may be traced as follows;—from + side of battery, wire 52, fuse 53, wire 84, blow-out coil 85, reversing switch contacts to wires 86, 87, and 38, thence through the armature of the hoisting motor M, to wire 88, reversing switch contacts to wire 89, through the ampere hour meter to wire 90, fuse 91, and to the — side of the battery by wire 92.

The winding of the reversing switch R''', receives its current supply from the dynamotor, the circuit being as follows;—from + main 73, wire 78, through switch 2 whose winding 79 is connected across the dynamotor leads 73 and 76, wire 80, through the winding of the reversing switch R''', wire 81, limit switch 3, wire 82, through car switch to wire 83, thence through contact 47" to the — lead 76.

The winding 79 is connected across the dynamotor leads 73, and 76, and will not operate to close the switch 2 until the generated voltage of the dynamotor has about reached a value desired for the emergency operation, which value in the present instance is about 500 volts, and in this manner the reversing switches R", R''' are prevented from operating until the desired voltage is obtained from the dynamotor.

The circuit for the brake winding may be traced as follows;—from the + wire 73 leading from the dynamotor, wires 93, 94, auxiliary contacts 96, wire 97, switch 98 controlled by the brake apparatus, through brake winding to wire 99, auxiliary contacts 100, wire 101, and thence to — wire 76 leading to the dynamotor.

By centering the car switch A', the hoisting motor is disconnected from the battery circuit and the brake winding is disconnected from its source of supply, the brake applies and the hoisting motor is brought to rest, it being understood that the shunt field winding S remains energized, the circuit therefor being opened only by operation of the safety switch X in the elevator car.

Operation of the hoisting motor in a reverse direction is effected by reversing the current through the armature, this being effected by moving the car switch toward the right hand, to effect operation of the emergency switch R", the mode of operation of the emergency controller being the same as has just been described.

The parts operate automatically to charge the storage battery in the following manner;—when the capacity of the storage battery drops to a predetermined value as indicated by the ampere hour meter, the dial or insulated member 7, controlled by the said meter, actuates and closes the contacts 9, the latter closing a circuit for the winding of switch 5; the circuit being traced as follows;—from + side of the battery to wire 52, fuse 53, wire 102, contact 103, wire 104, through winding of the switch 5 to wire 105, switch 6, wire 106, contacts 9, and wire 110 to the — side of the battery by way of wire 90, fuse 91 and wire 92. The switch 5 will now operate and close a circuit for the winding of the electro-magnetic switch or charging switch 4, the latter now operating to connect the storage battery with the main line source of power supply, the pressure of which is reduced by the resistance 111, to that desired for the charging operation. If the voltage across the mains is, say, 500 volts for example, the ohmic value of the resistance, 111, will be such as to produce a drop of 450 volts, which results in the mains delivering, say, substantially 50 volts to charge the battery. The switch 4 also closes the auxiliary contacts 112 which close a self-holding circuit for the winding of the switch 5, the result being to maintain the charging switch 4 closed when the ampere meter releases the contacts 9, and when the capacity of the battery reaches the desired value, the dial actuates and closes the contacts 8, which close a circuit which includes the contacts 112, for the winding of the switch 6, which operates to open its contacts, thereby opening the circuit of the winding of the switch 5, which in turn opens its contacts to open the circuit for the winding of the charging switch 4, the latter thereupon opening its contacts to disconnect the storage battery from the main line source of supply and at the same time opening the circuit for the winding of the switch 6 at the contacts 112, the parts now assuming their normal inoperated position as illustrated in the drawing.

The manual switch 10 controls a parallel circuit around the charging switch 4, and when closed connects the storage battery with the main line source of power supply.

In the modification illustrated in Fig. 2, a motor generator set is employed to charge the storage battery, the set comprising a separately excited low voltage unit H', and a relatively high voltage unit H'', the two units being mechanically coupled together, and controlled for the emergency car operation in substantially the same manner as the dynamotor illustrated in Fig. 1.

The unit H' functions as a motor during the emergency car operation, it receiving its current supply from the storage battery, and for the charging operation as a generator to charge the storage battery. The unit H'' functions as a generator for the emergency car operation, it supplying a relatively high voltage to the field windings of the hoisting motor and the brake winding, and for the charging operation as a motor, it receiving its current supply from the main line source, which is relatively of high voltage as already mentioned in connection with Fig. 1.

The parts operate as follows to effect the automatic charging operation of the battery by means of the motor generator.

The ampere hour meter by closing contacts 9, closes a circuit for the winding of a switch 113, as follows; + side of battery to wire 52, wire 114, winding of switch 113, to wire 115, contacts 116 associated with a switch 117, wire 118, contacts 9, wires 119, 119', thence through ammeter and ampere hour meter to the − side of the battery. The switch 113 now operates to close its contacts, the contacts 120, closing a circuit for the winding of a switch 121 which circuit may be traced from the + side of battery to wire 52, contact 122, winding of the switch 121, wire 123, contacts 120, wires 124, 125, and thence to the − side of the battery by way of wire 119'. Contacts 120' close a self-holding circuit for the winding of the switch 113, this circuit including the contacts 116.

The switch 121 will now close, thereby effecting operation of the motor generator set, the unit H' now functioning as a motor, receiving its current supply from the battery G, and the unit H'' functioning as a generator. A switch 126 is provided with a winding connected across the terminals of the unit H'', this winding becoming operative when the voltage of the unit H'' has built up to a predetermined value, to actuate the switch 126, thereby connecting the unit H'' to the main source of power supply by way of contacts 128, and increasing the field strength of the unit H' by short-circuiting a resistance 127. As a result of the above operation the unit H'' now functions as a motor and the unit H' as a generator, the latter supplying a voltage higher than that of the battery, so that the battery now becomes charged.

When the desired charge is obtained the contacts 8 are closed by the ampere hour meter, thereby closing a circuit to the winding of the switch 117 which now operates to open its contacts 116, the latter opening the self-holding circuit for the winding of the switch 113. The switch 113 now opens its contacts and in this manner the charging operation is interrupted by opening the switches 126 and 121.

The circuit for the winding of the switch 117 includes contacts 129 controlled by the switch 113, thus when the latter opens, it opens the circuit for the above-noted winding and the switch 117 will thereupon close its contacts 116.

By closing the knife switch 10, the battery charging operation is effected in the same manner as has just been described as by the closing of contacts 9.

The motor generator set shown in the modification together with the battery G, form the auxiliary source of supply for the hoisting motor, they being controlled in substantially the same manner as the battery and dynamotor in Fig. 1, to effect the emergency car operation, the connections between the battery and the armature of the hoisting motor, the motor generator set and the field of the hoisting motor and brake winding not being shown in Fig. 2, since they are obvious in view of the illustration in Fig. 1.

It will be seen now that in the operation of the system described, the car operator, in the event of a failure of the main source of power supply, may, without delay throw over the safety switch X and in this manner, provide illumination in the elevator car, and bring into use the emergency apparatus by means of which the car may be continued in operation.

Having described the invention and without limiting ourselves to the precise details and arrangement of parts as illustrated herein, what we claim is:—

1. In an electric elevator system, the combination of a car, a hoisting motor, and hoisting cables between the car and motor, a high voltage main source of power supply for the motor, and a low voltage auxiliary source of power supply for the motor, independent of the said main source of supply, comprising a relatively low voltage storage battery, and a relatively high voltage motor generator set, comprising a separately excited low voltage unit, adapted, in case of an emergency, to receive current from the said low voltage auxiliary source of power and function as a motor and, in a different case, to act as a generator and deliver low voltage power to the said auxiliary source of power, and a relatively high voltage unit, adapted to deliver current to the field windings of the hoisting motor, and as a motor to receive current from the said high voltage main in the charging operation of the said low voltage auxiliary source of power.

2. In an electric elevator system, the combination with the hoisting motor, electro-responsive brake apparatus therefor, a source of power supply for the motor and brake, an auxiliary source of power supply comprising a storage battery forming the supply for the armature of the hoisting motor, and a motor generator forming the supply for the field winding of the hoisting motor and the brake.

3. In an electric elevator, the combination with the car, a hoisting motor therefor, a source of power supply, an auxiliary source of power supply comprising a storage battery and a direct current voltage transforming device, means to effect operation of the hoisting motor by power from the first named source of supply, and means controllable from the car to control connections between the storage battery and the armature of the hoisting motor, and between the field of the hoisting motor and the direct current voltage transforming device.

4. In an electric elevator system, the combination with the car, a hoisting motor therefor, an electro-responsive brake apparatus, a source of power supply, means controllable from the car to effect operation of the hoisting motor and brake by power from the said source of supply, an auxiliary source of power supply comprising a storage battery and direct current voltage transforming device, means controllable from the car to control connections between the direct current voltage transforming device and the field winding of the hoisting motor and between the storage battery and the direct current voltage transforming device, and reversing switch mechanism to control circuits between the storage battery and the armature of the hoisting motor.

5. In an electric elevator system, the combination with the car, a hoisting motor therefor, an electro-responsive brake apparatus, a source of power supply, means controllable from the car to effect operation of the motor and brake by power from the said source of supply, an illuminating device in the car, an auxiliary source of power supply comprising a storage battery and a direct current voltage transforming device, means controllable from the car to connect the field winding of the hoisting motor in circuit with the direct current voltage transforming device, and to connect the direct current voltage transforming device and illuminating device in circuit with the storage battery, and reversing switch mechanism to control circuits between the storage battery and the armature of the hoisting motor, and between the direct current voltage transforming device and the brake apparatus.

6. In an elevator system, the combination with a car, an electric motor, an electro-responsive brake apparatus, a main source of power supply for the operation of the elevator; a storage battery forming an auxiliary source of power supply for the armature of the hoisting motor, a direct current voltage transforming device forming a source of power supply for the field winding of the hoisting motor and the brake winding, the direct current voltage transforming device being supplied from the storage battery, and means to maintain the storage battery in charged condition.

7. In an electric elevator system, the combination with the car, a hoisting motor therefor, an electro-responsive brake apparatus, a main source of supply for the motor, a storage battery forming an auxiliary source of power supply for the armature of the hoisting motor, a direct current voltage transforming device forming a source of power supply for the field winding of the hoisting motor and the brake, the direct current voltage transforming device being supplied from the storage battery, reversing switch mechanism, an electro-magnet to operate the reversing switch mechanism, and a switch in the car to control a circuit between the said electro-magnet and the direct current voltage transforming device.

8. In an electric elevator system, the combination with the car, a hoisting motor therefor, an electro-responsive brake apparatus, a source of power supply, means to effect operation of the motor and brake by power from the said source of supply, an auxiliary source of power supply comprising a storage battery and direct current voltage transforming device, a switch to control a circuit between the direct current voltage transforming device and the field winding of the hoisting motor, an operating winding for the said switch, a switch in the car to control a circuit between the storage battery and the said operating winding, reversing switch mechanism to control the supply of current from the storage battery to the armature of the hoisting motor, an electro-magnet to actuate the reversing switch mechanism, and means to control a circuit between the electro-magnet and the direct current voltage transforming device.

In testimony whereof, we have signed our names to this specification in the presence of two subscribing witnesses.

EDWIN G. DAVIS.
DAVID L. LINDQUIST.

Witnesses:
ERNEST L. GALE, Jr.,
HAZEL R. GATES.